(12) United States Patent
Leroy et al.

(10) Patent No.: US 11,703,422 B2
(45) Date of Patent: Jul. 18, 2023

(54) ATTACHMENT SYSTEM FOR BOX FOR MEASURING CHARACTERISTICS OF A TIRE

(71) Applicant: COMPAGNIE GENERALE DES ETABLISSEMENTS MICHELIN, Clermont-Ferrand (FR)

(72) Inventors: Vianney Leroy, Clermont-Ferrand (FR); Denis Martin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 3 days.

(21) Appl. No.: 17/043,393

(22) PCT Filed: Mar. 26, 2019

(86) PCT No.: PCT/IB2019/052466
§ 371 (c)(1),
(2) Date: Sep. 29, 2020

(87) PCT Pub. No.: WO2019/186409
PCT Pub. Date: Oct. 3, 2019

(65) Prior Publication Data
US 2021/0025783 A1    Jan. 28, 2021

(30) Foreign Application Priority Data
Mar. 30, 2018 (FR) .................... 1870370

(51) Int. Cl.
*G01M 17/02* (2006.01)
*B60C 11/24* (2006.01)
(Continued)

(52) U.S. Cl.
CPC .......... *G01M 17/02* (2013.01); *B60C 11/246* (2013.01); *F16B 21/086* (2013.01); *G01B 7/10* (2013.01)

(58) Field of Classification Search
CPC . B29K 2023/12; B60C 11/246; F16B 21/086; G01B 7/10; G01B 7/107; G01B 7/26; G01M 17/02
See application file for complete search history.

(56) References Cited

U.S. PATENT DOCUMENTS 9,222,615 B2    12/2015 Wiersma et al.
9,660,232 B2 *   5/2017 Imamura ............... H01M 50/50
(Continued)

FOREIGN PATENT DOCUMENTS

DE          3321845 U1    12/1983
DE     202006010426 U1     8/2006
(Continued)

OTHER PUBLICATIONS

International Search Report dated Jul. 17, 2019, in corresponding PCT/IB2019/052466 (5 pages).

*Primary Examiner* — John Fitzgerald
*Assistant Examiner* — Gedeon M Kidanu
(74) *Attorney, Agent, or Firm* — Venable LLP

(57) ABSTRACT

A fastening system for fastening an electronic device (2) in a measurement housing (1), comprising: an electronic-device holder (10) designed to accommodate an electronic measurement device (2); and a prestressing ring (20) that is able to cooperate with said holder (10) for assembly and comprises a plurality of prestressing beams (22, 25) designed to bear on said electronic device (2) when said ring is assembled together with the holder, said electronic device (2) being inserted into said holder (10).

10 Claims, 2 Drawing Sheets

(51) Int. Cl.
*F16B 21/08* (2006.01)
*G01B 7/06* (2006.01)

(56) References Cited

U.S. PATENT DOCUMENTS

| | | | |
|---|---|---|---|
| 10,113,855 B2 | 10/2018 | Ledoux et al. | |
| 2009/0000370 A1* | 1/2009 | Lionetti | G01B 11/22 73/146 |
| 2012/0181274 A1* | 7/2012 | Fetzer | B29C 45/006 137/15.01 |
| 2014/0363716 A1* | 12/2014 | Nishida | H01M 50/242 429/96 |
| 2015/0069199 A1* | 3/2015 | Wiersma | G01D 11/245 248/315 |
| 2016/0153763 A1* | 6/2016 | Ledoux | G01M 17/02 73/146 |
| 2017/0350781 A1* | 12/2017 | Ledoux | G01L 17/005 |
| 2017/0350792 A1* | 12/2017 | Ledoux | G01M 17/021 |

FOREIGN PATENT DOCUMENTS

| | | | | |
|---|---|---|---|---|
| DE | 102009013949 A1 | 9/2010 | | |
| FR | 3007517 A1 | 12/2014 | | |
| JP | 6249911 B2 | 12/2017 | | |
| JP | 2017220426 A * | 12/2017 | ............ | H01R 12/71 |
| JP | 6732172 B2 * | 7/2020 | ............ | H01R 12/71 |
| WO | 2014/202747 A1 | 12/2014 | | |

\* cited by examiner

ATTACHMENT SYSTEM FOR BOX FOR MEASURING CHARACTERISTICS OF A TIRE

TECHNICAL FIELD OF THE INVENTION

The present invention relates to a ground-fastening system for a measurement housing. It relates more particularly to a fastening system for fastening a measurement device in such a housing. In a preferred application, the present invention relates to a fastening system for fastening a magnetic sensor in a housing for measurement of tyre characteristics.

PRIOR ART

The document WO 2014/202747 describes a system for measuring the thickness of a layer of rubbery material of a tyre. It takes the form of a housing to be fixed to the ground. In use, this type of housing is subject to high stresses on account of numerous vehicles of all types, including heavy-duty vehicles, driving over it. Despite these high stresses, the housing must not move or lift. The housings are therefore often fastened to the ground by means of significant infrastructure in the ground. This infrastructure involves major work, which is both time-consuming and costly. Moreover, if a housing proves to be badly positioned, any repositioning also requires major work, involving heavy equipment. There is therefore a need to make it possible to easily fasten and reposition the measurement housings, with simplified implementation.

The document FR3007517 describes a system for measuring the thickness of a layer of rubber for a tyre. This system uses a static magnetic field source and an element for measuring the magnetic field. Such a system is intended to be installed in a housing over which the vehicles run. The measurements are taken when the wheels pass over the housing.

The housing has to be able to withstand significant loads. The load stresses are linked to the number of vehicles running over the housing and to their weight. Furthermore, malfunctioning of the various electronic elements can be caused in particular by vibrations while the vehicles drive over.

The invention provides various technical means for remedying these various drawbacks.

SUMMARY OF THE INVENTION

First of all, a first objective of the invention consists in providing a fastening system for fastening an electronic device, for example a magnetic sensor, in a measurement housing, for example for measurement of tyre characteristics, which allows the constituent elements to be assembled without ply or the risk of vibration.

Another objective of the invention consists in providing a fastening system for a housing for measurement of tyre characteristics that is quick and easy to install in the ground.

Another objective of the invention consists in providing an economical and easily industrializable fastening system.

Another objective of the invention consists in providing a fastening system that does not disturb the operation of the measurement housing.

To this end, the invention provides a fastening system for an electronic device such as a magnetic sensor comprising an annular magnet and an electronic circuit for reading a magnetic field able to be generated by said magnet, for fastening in a measurement housing, comprising:
an electronic-device holder designed to accommodate an electronic measurement device;
a prestressing ring that is able to cooperate with said holder for assembly and comprises a plurality of prestressing beams designed to bear on said electronic device when said ring is assembled together with the holder, said electronic device being inserted into said holder, wherein the prestressing ring has an annular body bearing a plurality of peripheral beams distributed circumferentially around the perimeter of said annular body, said peripheral beams being designed to bear against said annular magnet of the magnetic measurement sensor when the latter is accommodated in the holder and the ring is assembled together with said holder.

The solution makes it possible to fasten the measurement elements without play in order to ensure good measurement quality. The fastening is also durable. The solution is quick and easy to industrialize. It comprises few parts. Mounting and installation handling are simple. The overall cost is very advantageous.

Advantageously, the prestressing ring has a diametrical beam designed to bear against said electronic circuit when the latter is accommodated in the holder and the ring is assembled together with said holder.

In order to effect fastening without play, prestressing is applied that keeps the elements in contact at their reference surfaces. In order to realize this prestressing at low cost, the elasticity of the materials is used. A mechanical beam that is stressed in bending has a spring effect and thus applies prestressing to the elements. The beam has to apply a sufficiently large force such that, in the event of an impact, the inertia of the elements does not apply a force greater than that of the beam. During dimensioning, it is also ensured that the beam remains in its elastic domain so as to keep this "spring effect". The play is thus virtually zero and makes it possible to ensure a quality measurement.

In one advantageous embodiment, the holder has at least one peripheral arch provided with an arch opening.

According to another advantageous embodiment, the ring has at least one securing finger that is able to cooperate with said arch opening in order to secure the ring to the holder with prestressing of the beams bearing against the magnetic sensor when the latter is accommodated in the holder.

The assembly of the ring in the holder can thus be effected very easily. By bearing on the ring, the beams are prestressed. The assembly makes it possible to keep this prestressing.

Advantageously, the beams are elastically deformable.

The assembly of the fastening system with deformation of the beams makes it possible to generate a clamping force against the magnetic sensor accommodated in the fastening system.

The invention also provides a housing for measurement of tyre characteristics, comprising:
(i) at least one magnetic sensor provided with a circumferential magnet and with an electronic circuit for reading a magnetic field able to be generated by said magnet;
(ii) at least one fastening system as described above;
(iii) at least one cavity for accommodating a sensor when the latter is assembled under prestressing in a fastening system;
(iv) a housing cover closing the cavity.

Advantageously, the housing furthermore comprises at least one disc that is insertable into the body of the ring, said disc bearing a bearing finger that extends perpendicularly to the plane of the disc and is designed to bear on the diametrical beam when said housing cover is closed.

These features make it possible to create a fastening system that is very simple, inexpensive and robust, with quick and functional installation of the sensors.

DESCRIPTION OF THE FIGURES

All the embodiment details are given in the following description, which is supplemented by FIGS. 1 to 7b, which are given solely by way of non-limiting examples and in which:

FIG. 5b is an elevation view of the ring in FIG. 5a;

FIG. 6b is an elevation view of the holder and the ring in FIG. 6a;

DETAILED DESCRIPTION OF THE INVENTION

Housing for Measurement of Tyre Characteristics

Figure 1:
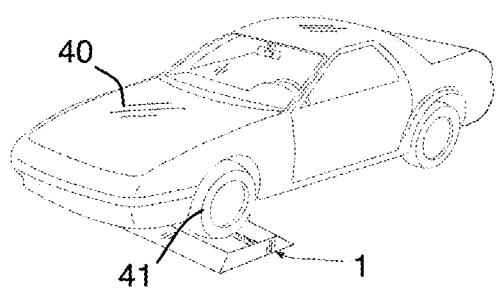
FIG. 1 is a perspective view of an example of a housing for measurement of tyre characteristics.
Figure 2:
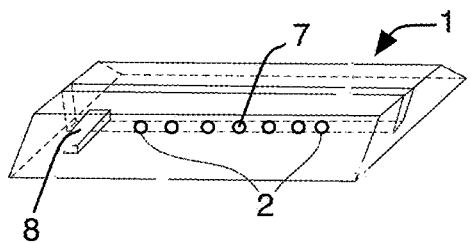
FIG. 2 is a close-up perspective view of the housing in FIG. 1.

FIGS. 1 and 2 illustrate an example of a known system 1 for measuring the thickness of a layer of rubbery material of a tyre 41 of a vehicle 40, such as the one described in the document FR3007517. When the vehicle 40 drives over the housing 1, sensors make it possible to carry out one or more measurements, for example measurements of the tread thickness of the tyre 41. To carry out the measurements, the device is preferably placed in a location that facilitates the vehicles 40 driving over it. The manner in which the housing is fastened is therefore advantageously designed to withstand the severe stresses associated with many vehicles driving over it. These stresses require reliable and durable fastening, as described in the following figures.

The plate 1 is fastened to the ground by conventional means, for example glue. The plate has a plurality of recesses 7. In the example illustrated, the recesses 7 are aligned in the longitudinal direction of the plate, parallel to the edges and spaced apart regularly. Each of the recesses 7 can receive a fastening system as described below in this document.

Operating Principle of the Magnetic System for Measurement of Tyre Characteristics The sensor of known type makes it possible to measure the thickness of a layer of rubbery material of a tyre, for example the tread. In a conventional manner, such a layer has a face joined to an adjacent reinforcement produced with at least one material with a magnetic permeability greater than the magnetic permeability of air and a free face in contact with the air. The sensor is designed to measure the distance between the joined face and the free face of the layer of rubbery material.

The sensor has a static magnetic field source and a sensitive element, the output signal of which depends on the level of the local magnetic field, disposed such that the magnetic field strength measured by the sensitive element varies when the distance to be measured decreases.

If a metal reinforcement, which is a good magnetic field conductor and a poor conductor of electricity, such as a crown ply of a tyre made up of parallel metal reinforcers embedded in two layers of low-conductivity rubber material, is brought towards this device, the field lines will naturally attempt to pass through this metal reinforcement rather than through the air, because the reluctance of air is greater than that of the metal reinforcement. A localization of the magnetic field lines through the metal reinforcement is observed. The result is that the magnetic flux density will increase in the area situated between the coil and the metal reinforcement. The operating mode of the sensor uses this physical principle and is a reluctance mode, and so it is related to the magnetic permeability of the different parts of the magnetic circuit formed by the source and the object of which the distance is measured with the sensor.

The thicknesses of the tread have a very small thickness to be measured. Consequently, the measurement needs to be extremely precise.

In order to ensure a precise and reliable measurement, it is necessary for the different elements that make up the measurement chain to be held perfectly, if possible without play or with as little play as possible. The slightest play between the elements of the sensor and/or between the elements of the sensor and the housing could impair the quality or reliability of the measurements. As described below, the elements are fastened such that there is a minimum of vibration and/or of displacement of the parts of the system

Fastening System

Figure 3A:
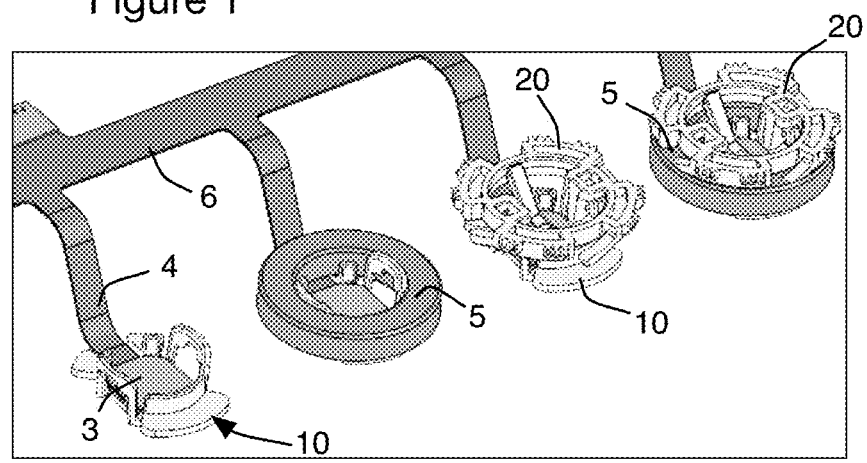
FIG. 3a is a perspective view of an example of a magnetic sensor in different steps of assembly in a measurement housing.
Figure 3B:
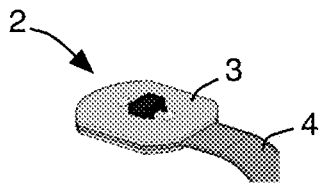
FIG. 3b is a perspective view of an example of an electronic circuit of a sensor.
Figure 3C:
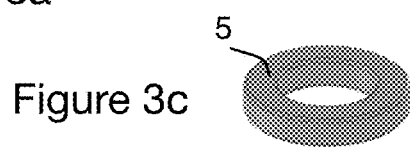
FIG. 3c is a perspective view of an example of a sensor magnet.

FIGS. 3a, 3b and 3c illustrate an exemplary embodiment of a magnetic sensor 2 of known type. In FIG. 3a, the sensor is present in different stages of the assembly thereof with a fastening system described in detail in relation to FIGS. 5a to 7b.

As illustrated in FIG. 3b, the magnetic sensor 2 comprises an electronic circuit 3 connected to multiple wiring 6 by way of individual or simple wiring 4. In a housing 1 for measurement of tyre characteristics having a plurality of sensors 2, each of the latter is connected to multiple wiring 6 by simple wiring 4. The multiple wiring 6 connects a plurality of sensors 2 to a controller 8, illustrated in FIG. 2. The sensor also comprises a circumferential magnet 5, as illustrated in FIG. 3c, in which the electronic circuit can be positioned.

A fastening system makes it possible to assemble the magnetic sensors 2 optimally in the housing 1. This system comprises a magnetic-sensor holder 10 and a prestressing ring 20. The holder 10 and the ring 20 are described in detail in relation to FIGS. 4 to 7b.

Figure 4:
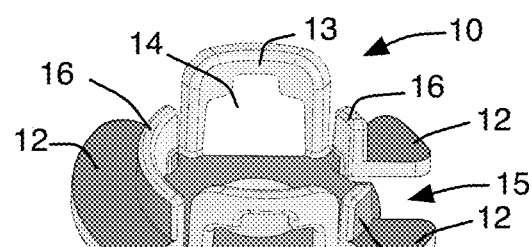
FIG. 4 is a perspective view of an example of a magnetic-sensor holder.

FIG. 4 illustrates an example of a magnetic-sensor holder 10. This holder makes it possible to accommodate the electronic circuit 3 and to carry the magnet 5 so as to allow these elements to be integrated in the housing 1.

The holder 10 comprises a platform 11 with a profile substantially complementary to that of the electronic circuit 2. This platform 11 makes it possible to accommodate the electronic circuit. Peripheral rims 16 partially surround the platform 11 so as to properly hold the edges of the electronic circuit 3. Radial arms 12 are arranged at the periphery of the platform 11. In the exemplary embodiment illustrated in the figures, the holder 10 is provided with three radial arms 12. The radial arms 12 each have a substantially flat surface, all of the surfaces being substantially coplanar so as to form a base provided to carry the magnet 5 of the magnetic sensor 2. The peripheral rims 16 are furthermore designed to fit in the opening of the annular magnet 5, making it possible to centre the latter properly on the holder and to minimize transverse vibrations or movements.

Peripheral arches 13 are arranged at the periphery of the platform 11. In the example illustrated, two peripheral arches 13 are arranged opposite one another, on either side of the platform 11 between the radial arms 12 and the peripheral rims 16. The peripheral arches 13 each have an arch opening 14. These arch openings 14 are intended to cooperate with the prestressing ring 20 described below.

On one side of the arches 13, two of the three arms 12 have a reduced size so as to form a passage 15 through which the simple wiring 4 can pass, in order to reach the electronic circuit 3.

Figure 5A:
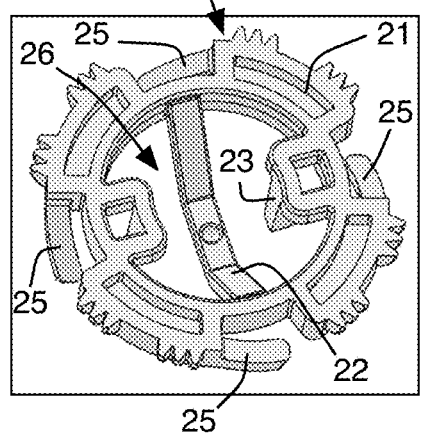
FIG. 5a is a top view of an example of a prestressing ring.
Figure 5B:
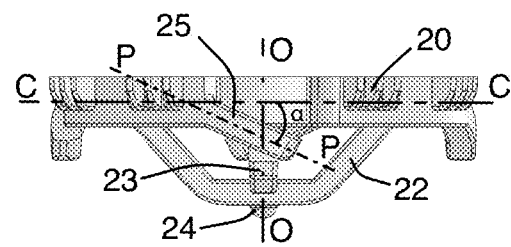

FIGS. 5a and 5b illustrate an example of a prestressing ring 20. The prestressing ring 20 comprises an annular body 21, clearly visible in FIG. 5a, provided with a more or less central opening 26, of axis O-O. The opening 26 in the prestressing ring 20 has a substantially circular profile, complementary to the profile of the holder 10.

In the opening 26, a U-shaped diametrical beam 22 passes through the prestressing ring 20. The median portion of the beam is offset with respect to the annular body 21 of the ring and is located under the body when the latter is in an assembled position in the housing 1.

A bearing stud 24 is disposed on this median portion of the diametrical beam, on the opposite side from the annular body 21. The diametrical beam 22 and the stud 24 are intended to interface with the electronic module and exert a prestressing force on the latter when all of the elements of the fastening system and the magnetic sensor are assembled. In this example, there is one bearing stud 24, which has a hemispherical profile.

The prestressing ring 20 comprises at least one circumferential beam 25, arranged at the periphery of the annular body 20. In the example illustrated, the prestressing ring 20 comprises four circumferential beams 25, arranged substantially at 90° to one another around the outer perimeter of the annular body 21. The beams are inclined at an angle α formed between the axis P-P of the circumferential beam 25 and the plane C-C of the annular body 21. The angle α is between 5° and 45°, and preferably between 15° and 25°. As a variant, the beams are curved and form a variable angle along their profile. The beams are designed to exert a resilient bearing force on the magnet 5 of the magnetic sensor when all of the elements of the fastening system and the magnetic sensor are assembled.

Figure 6A:
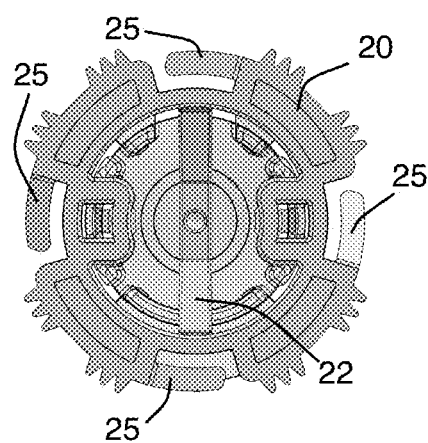
FIG. 6a is a top view of an example of the assembly of a prestressing ring on a holder.
Figure 6B:
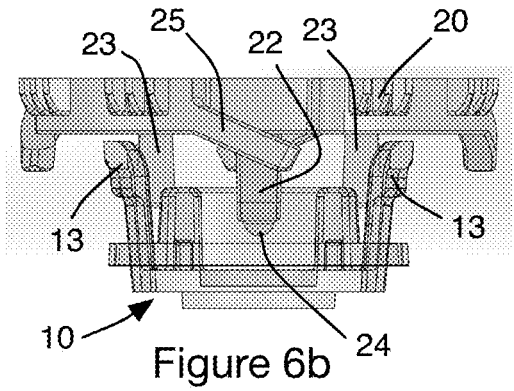
Figure 6C:
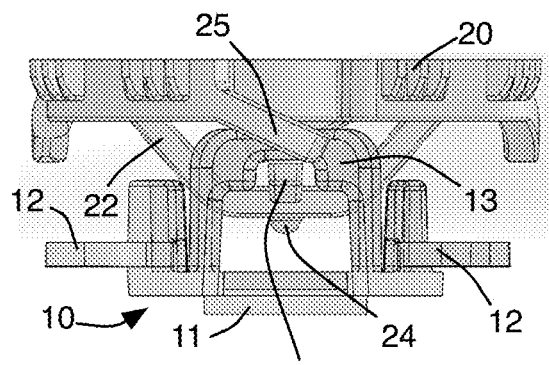
FIG. 6c is an elevation view of the holder and the ring in FIG. 6a at a different angle.

The prestressing ring 20 comprises at least one securing finger 23 extending coaxially with the axis O-O of the opening 26, in the same direction as the diametrical beam 22. The securing finger makes it possible to fasten the prestressing ring 20 to the holder 10, as described in more detail in relation to FIGS. 6a to 6c. In the exemplary embodiment illustrated, the prestressing ring 20 comprises two securing fingers 23 disposed opposite one another, on either side of the diametrical beam 22. As shown in FIG. 6b, the fingers form elongate hooks that are designed to cooperate with the arch openings 14 in the magnetic-sensor holder 10. FIGS. 6a and 6b illustrate the prestressing ring assembled on the holder 10 in two different angular positions. In FIG. 6a, the view is such that the diametrical beam 22 is shown in profile. In FIG. 6b, with an angular offset of 90° with respect to the view in FIG. 6a, the diametrical beam is in face-on view.

Figure 7A:
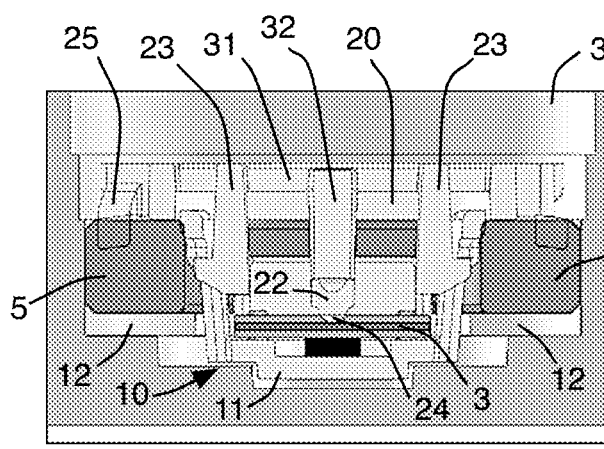
FIG. 7a is an elevation view of an example of a sensor fully assembled in a measurement housing.
Figure 7B:
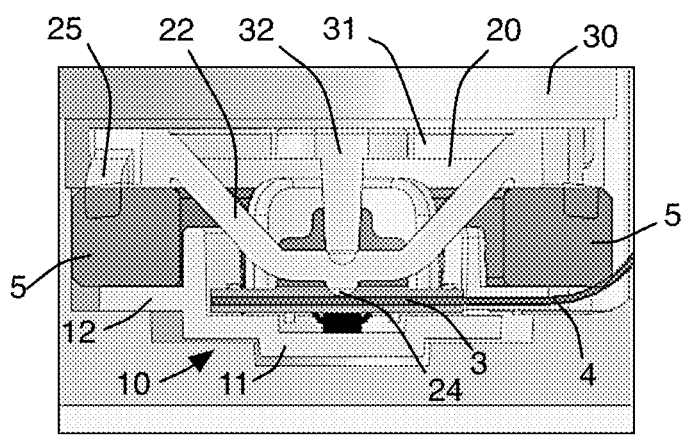
FIG. 7b is a view of the assembled sensor in FIG. 7a at a different viewing angle.

FIGS. 7a and 7b illustrate the full assembly of the magnetic sensor 2, with the fastening system, the assembly being inserted in a housing 1 for measurement of tyre characteristics. FIGS. 7a and 7b correspond to the views in FIGS. 6a and 6b, with similar angular positions.

In this assembled state, the securing fingers 23 are interlocked in the arch openings 14, such that the diametrical beam 22 exerts a bearing force on the electronic circuit 3 with the aid of the bearing finger 24 and the circumferential beams 25 exert a bearing force on the magnet 5. The electronic circuit 3 and the magnet 5 are thus assembled together with a tight assembly, under stress. This stress also originates from the elasticity and the resilience of the materials of the prestressing ring 20 and from the fact that when the securing fingers 23 fit in the arch openings 14, the diametrical beam 22 and the circumferential beams 25 are placed under stress.

FIGS. 7a and 7b illustrate a portion of a housing 1 in which a magnetic sensor is accommodated. A disc 31 comprising a bearing finger 32 is positioned on the prestressing ring 20. This arrangement makes it possible to hold the assembly system (magnetic-sensor holder 10 and prestressing ring 20) in which the magnetic sensor 2 is inserted.

In this exemplary embodiment, the bearing finger 32 is inserted in a cutout in the diametrical beam situated on the opposite side from the bearing stud 24, as illustrated in FIG. 7b. A cover 30 is disposed on the disc 31 and bears on the latter, such that the bearing finger 32 exerts a force against the diametrical beam 22. The prestressed assembly is thus implemented on all the elements. The cover 30 also makes it possible to ensure the sealing of the magnetic sensor 2 and provides protection against various external attacks.

Materials

The magnetic-sensor holder 10 and the prestressing ring 20 are advantageously made of a thermoplastic polymer such as PBT, preferably with a glass-fibre filler. In variants, it is also possible to use elements made of PET, PMMA, PC, or polyamide, preferably with a filler.

REFERENCE NUMERALS EMPLOYED IN THE FIGURES

1 Measurement housing (for example for tyre characteristics)
2 Electronic measurement device (for example a magnetic sensor for measurement of tyre characteristics)
3 Electronic circuit (PCB)
4 Simple wiring
5 Annular magnet
6 Multiple wiring
7 Sensor recess
8 Controller
10 Electronic-device holder
11 Central stage 12 Radial arms
13 Peripheral arch
14 Arch opening
15 Passage for the simple wiring
16 Peripheral rim
20 Prestressing ring
21 Annular body
22 Diametrical beam
23 Securing finger
24 Bearing stud
25 Circumferential beam
26 Opening in prestressing ring
30 Cover
31 Disc
32 Bearing finger
40 Vehicle
41 Tyre

The invention claimed is:

1. A fastening system for fastening, in a measurement housing, an electronic device including an annular magnet and an electronic circuit for reading a magnetic field able to be generated by the magnet, the fastening system comprising:
    an electronic-device holder configured to accommodate the electronic device; and
    a prestressing ring configured to cooperate with the electronic-device holder for assembly and comprising a plurality of prestressing beams designed to bear on the electronic device when the prestressing ring is assembled together with the electronic-device holder and the electronic device is inserted into the electronic-device holder,
    wherein the prestressing ring has an annular body bearing a plurality of peripheral beams distributed circumferentially around a perimeter of the annular body, the plurality of peripheral beams being included in the plurality of prestressing beams, the peripheral beams extending from the prestressing ring toward the electronic-device holder to bear against the annular magnet of the electronic device when the electronic device is accommodated in the electronic-device holder and the prestressing ring is assembled together with the electronic-device holder.

2. The fastening system according to claim 1, wherein the prestressing ring has a diametrical beam configured to bear against the electronic circuit when the electronic device is accommodated in the electronic-device holder and the prestressing ring is assembled together with the electronic-device holder, the diametrical beam being included in the plurality of prestressing beams.

3. The fastening system according to claim 1, wherein the plurality of prestressing beams are elastically deformable.

4. The fastening system according to claim 1, wherein each peripheral beam of the plurality of peripheral beams extends at an angle between 5° and 45° from a plane of the prestressing ring.

5. The fastening system according to claim 1, wherein the electronic-device holder has at least one peripheral arch provided with an arch opening.

6. The fastening system according to claim 5, wherein the prestressing ring has at least one securing finger configured to cooperate with the arch opening in order to secure the prestressing ring to the electronic-device holder with the plurality of prestressing beams bearing against the magnetic sensor when the electronic device is accommodated in the holder.

7. A housing for measurement of tire characteristics comprising:
    (i) at least one magnetic sensor including an annular magnet and an electronic circuit for reading a magnetic field able to be generated by the magnet;
    (ii) at least one fastening system according to claim 1;
    (iii) at least one cavity for accommodating one of the at least one magnetic sensor when the magnetic sensor is assembled under prestressing in the at least one fastening system; and
    (iv) a housing cover closing the cavity.

8. The housing according to claim 7, wherein the prestressing ring has a diametrical beam configured to bear against the electronic circuit when the electronic device is accommodated in the electronic-device holder and the prestressing ring is assembled together with the electronic-device holder, the diametrical beam being included in the plurality of prestressing beams, and
    wherein the housing further comprises at least one disc that is insertable into the annular body of the prestressing ring, the disc bearing a bearing finger that extends perpendicularly to a plane of the disc and that is designed to bear on the diametrical beam when the housing cover is closed.

9. The fastening system according to claim 1, wherein the electronic-device holder includes a plurality of radial arms having a surface to support the annular magnet of the electronic device when the electronic device is accommodated in the electronic-device holder.

10. The fastening system according to claim 9, wherein the peripheral beams extended in a direction from the prestressing ring toward the radial arms.

* * * * *